(12) United States Patent
Maxwell et al.

(10) Patent No.: US 8,601,706 B1
(45) Date of Patent: Dec. 10, 2013

(54) ADJUSTABLE FRONT STOP FOR A CHUCK AND METHOD OF USE

(76) Inventors: Jeffry R. Maxwell, Laguna Hills, CA (US); Kenneth T. Stump, Huntington Beach, CA (US)

( * ) Notice: Subject to any disclaimer, the term of this patent is extended or adjusted under 35 U.S.C. 154(b) by 610 days.

(21) Appl. No.: 12/955,349

(22) Filed: Nov. 29, 2010

Related U.S. Application Data

(60) Provisional application No. 61/266,243, filed on Dec. 3, 2009.

(51) Int. Cl.
B23B 49/00 (2006.01)

(52) U.S. Cl.
USPC ............................................ 33/639; 33/628

(58) Field of Classification Search
USPC ............ 33/494, 626, 628, 629, 630, 632, 642
See application file for complete search history.

(56) References Cited

U.S. PATENT DOCUMENTS

| | | | |
|---|---|---|---|
| 2,565,853 A * | 8/1951 | Jacobson | 33/626 |
| 2,647,325 A | 8/1953 | Little | |
| 2,659,980 A | 11/1953 | Dunn | |
| 3,021,604 A * | 2/1962 | Moore | 33/639 |
| 3,032,347 A | 5/1962 | Cambron | |
| 3,060,587 A | 10/1962 | Picken | |
| 3,094,787 A | 6/1963 | Moore | |
| 3,224,104 A * | 12/1965 | Platt, II | 33/642 |
| 3,499,226 A * | 3/1970 | Hopkins | 33/642 |
| 3,724,963 A * | 4/1973 | Stadtmiller | 33/642 |
| 5,251,918 A | 10/1993 | Morgan | |
| D352,218 S | 11/1994 | Nygards | |
| 5,491,905 A | 2/1996 | Jablonski | |
| 6,256,899 B1 * | 7/2001 | McGhee | 33/628 |
| 6,324,766 B1 | 12/2001 | Schooley | |
| 7,141,074 B2 | 11/2006 | Fanger et al. | |
| 7,207,121 B2 * | 4/2007 | Wixey | 33/626 |
| 7,497,647 B2 | 3/2009 | Cornwell | |
| 2001/0020336 A1 * | 9/2001 | Tadaki | 33/628 |
| 2005/0222571 A1 | 10/2005 | Ryan | |
| 2006/0134957 A1 | 6/2006 | Cornwell | |
| 2007/0296162 A1 | 12/2007 | Guy | |
| 2008/0018062 A1 | 1/2008 | Wachtler et al. | |
| 2008/0289206 A1 * | 11/2008 | Mastrobattista | 33/630 |
| 2009/0304467 A1 | 12/2009 | Kruse et al. | |

* cited by examiner

*Primary Examiner* — G. Bradley Bennett
(74) *Attorney, Agent, or Firm* — Eric Karich

(57) ABSTRACT

An adjustable stop tool has a rigid elongate body having a tool end, and a stop element slidably positioned on the rigid elongate body. The tool enables a method for positioning a segment of stock for machining and cutting, wherein the stop element is first locked on the rigid elongate body such that the stop element is separated from the tool end by a distance. A segment of the stock is then pulled out of the collet until the stock end is separated from the collet by more than the distance. The adjustable stop tool is then positioned against the stock and pushed towards the collet until the tool end abuts the collet.

9 Claims, 4 Drawing Sheets

ADJUSTABLE FRONT STOP FOR A CHUCK AND METHOD OF USE

CROSS-REFERENCE TO RELATED APPLICATIONS

This application for a utility patent claims the benefit of U.S. Provisional Application No. 61/266,243, filed Dec. 3, 2009.

STATEMENT REGARDING FEDERALLY SPONSORED RESEARCH

Not Applicable

BACKGROUND OF THE INVENTION

1. Field of the Invention

This invention relates generally to a tool for quickly and easily measuring out segments of stock for cutting, and more particularly to an adjustable stop tool and method for measuring the segment of stock so that it may be clamped by the collet and cut.

2. Description of Related Art

When machining and cutting stock, the common procedure is to pull out a segment of the stock, and measure the length of stock with a ruler. There are several disadvantages to this approach. First, it is slow and cumbersome to measure each piece with a ruler. Second, when the collet is closed on the stock, it tends to pull the stock back slightly in the closing process, changing the length of the piece.

The tool of the present invention enables each piece to be accurately measured in a single quick movement; and furthermore, the tool enables the user to hold the stock in a manner that prevents the stock from being pulled back when the collet is closed. Many other improved features are also included, as discussed below.

Various measuring tools are known in the art for measuring various items. Moore, U.S. Pat. No. 3,094,787, for example, teaches an extensible measuring rule that includes nested segments that are angular in cross segment and are maintained in an endwise telescoping and sliding relationship. The measuring rule is adapted for measuring room sizes, and sizes of windows and doors.

Schooley, U.S. Pat. No. 6,324,766, teaches a guide clamped to a ruler with a clamp structure that includes a shoe for locking the guide with respect to the ruler. The guide and ruler are adapted to be used to score gypsum wall board panels.

Jablonski et al., U.S. Pat. No. 5,491,905, teaches a jig for accurately spacing railing spindles. The jig includes an elongate base, a jig alignment guide, and a spindle alignment guide. The above-described references are hereby incorporated by reference in full.

The prior art teaches various measuring devices, jigs, and the like for measuring a variety of items, and for performing various tasks. However, the prior art does not teach the use of such a measuring device for quickly measuring out segments of a stock for machining and cutting operations. The present invention fulfills these needs and provides further related advantages as described in the following summary.

SUMMARY OF THE INVENTION

The present invention teaches certain benefits in construction and use which give rise to the objectives described below.

The present invention provides an adjustable stop tool and method for positioning a segment of stock for machining and cutting. The adjustable stop tool comprises a rigid elongate body having an inner surface and a tool end; a stop element slidably positioned on the rigid elongate body adjacent the inner surface; and a locking feature for locking the position of the stop element a distance with respect to the rigid elongate body. The stop element is positioned on the rigid elongate body such that the stop element is separated from the tool end by a distance. A segment of the stock is then pulled out of the collet until the stock end is separated from the collet by more than the distance. The adjustable stop tool is then positioned against the stock and pushed towards the collet until the tool end abuts the collet.

A primary objective of the present invention is to provide an adjustable stop tool, and method of use thereof, having advantages not taught by the prior art.

Another objective is to provide a adjustable stop tool for positioning a segment of the stock with respect to a collet for machining and cutting operations.

Another objective is to provide a adjustable stop tool for preventing the segment of the stock from being pulled into the collet when the collet is closed.

A further objective is to provide a adjustable stop tool that is quick and easy to use, and which nonetheless provides superior accuracy and reproducibility of results.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, an adjustable stop tool 10 for positioning a segment 14 of stock 12 (e.g., bar stock) in a collet 18. The stock 12 is then locked in place by the collet 18 for machining and cutting of the segment 14 of stock 12.

Figures 1, 2:
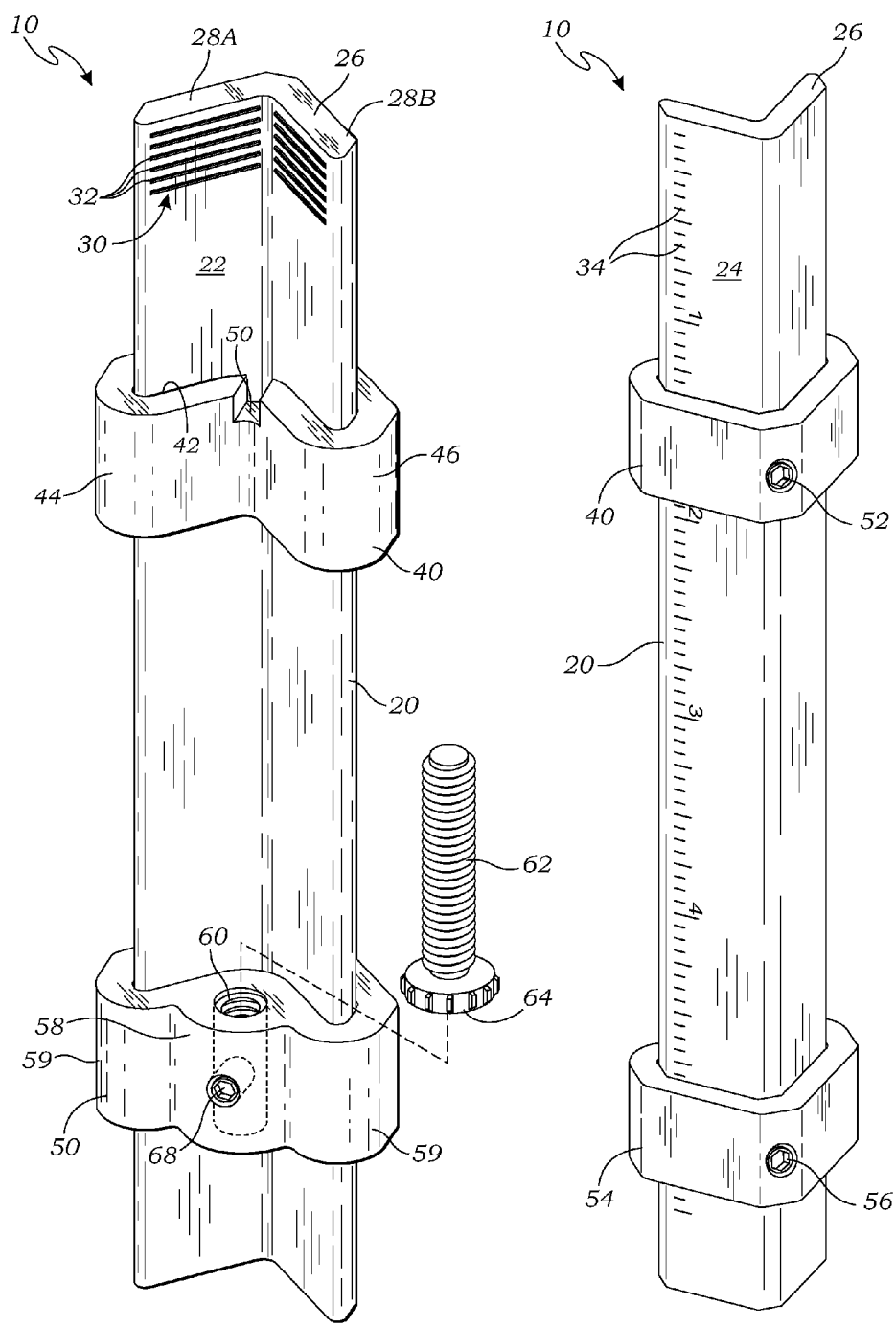
FIG. 1 is a front perspective view of a adjustable stop tool according to one embodiment of the present invention, illustrating a stop element and a second stop slidably mounted on a rigid elongate body.
FIG. 2 is a rear perspective view thereof.
Figure 3:
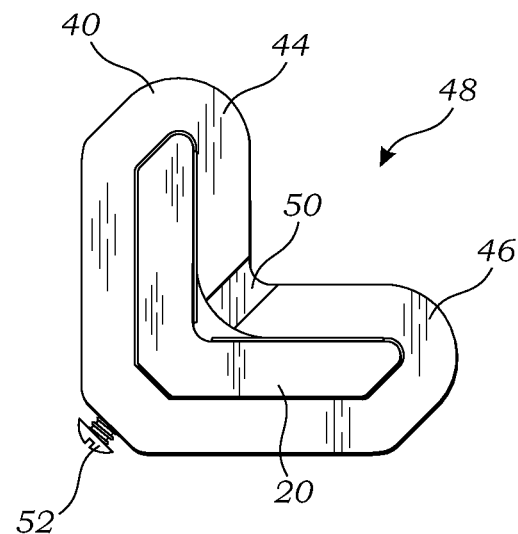
FIG. 3 is a top plan view thereof.
Figure 4:
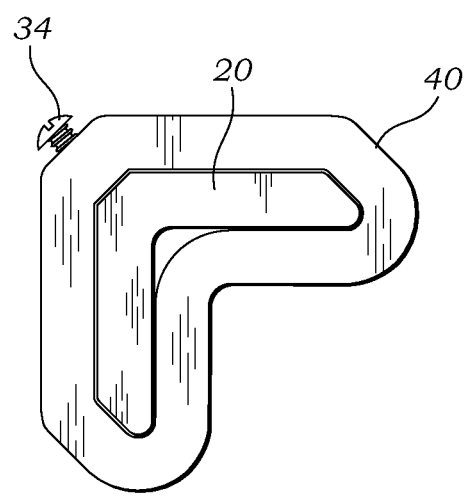
FIG. 4 is a bottom plan view thereof.

FIG. 1 is a front perspective view of the adjustable stop tool 10 according to one embodiment of the present invention. FIG. 2 is a rear perspective view thereof; FIG. 3 is a top plan view thereof; and FIG. 4 is a bottom plan view thereof. As illustrated in FIGS. 1-4, the adjustable stop tool 10 includes a rigid elongate body 20, a stop element 40, and a locking feature for locking the position of the stop element 40 with respect to the rigid elongate body 20.

The rigid elongate body 20 may include an inside surface 22, an outside surface 24, and a tool end 26. In one embodiment, the rigid elongate body 20 may include an L-shaped cross section, having first and second sides 28A and 28B that intersect at approximately right angles (although the angle may vary significantly, as desired). The inside surface 22 is adapted to receive the stock 12 thereupon. The inner surface may include a top lip area 30 that may include a frictional structure 32 such as traverse slots, ridges, or other frictional engagement structures, textures, or materials that facilitate gripping the stock 12, as discussed in greater detail below.

The rigid elongate body 20 may further include a measurement index 34 marked on the rigid elongate body 20. The measurement index 34 may be printed, etched, or otherwise formed on or fastened to the rigid elongate body 20, using any methods known in the art. In one embodiment, the measurement index 34 measures distance from the tool end 26, in one or more common units (e.g., inches, cm, etc.).

The stop element 40 is slidably engaged with the elongate body so that the position of the stop element 40 may be adjusted relative to the rigid elongate body 20. The stop element 40 may be adapted to fit around and slidably engage the elongate body. In one embodiment, the stop element 40 is generally L-shaped and includes an L-shaped slot 42 that is shaped to slidably receive the rigid elongate body 20 therethrough. Obviously, the particular shape of the stop element 40, and the nature of its interaction with the rigid elongate body 20 may vary, as long as its construction is consistent with the method of use of the tool, as discussed in greater detail below.

Figure 10:
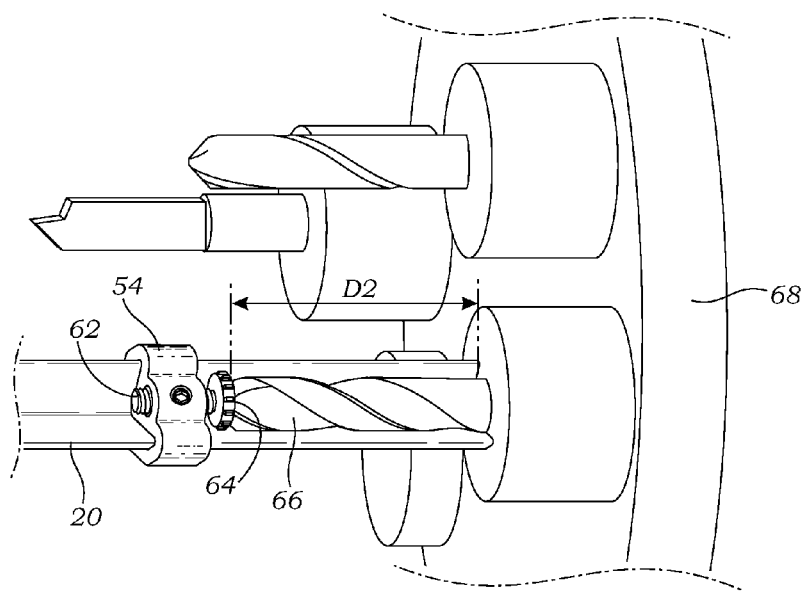
FIG. 10 is a perspective view of a cutting tool of a lathe turret being adjusted using the second stop of the adjustable stop tool.

In one embodiment, the stop element 40 may include first and second portions 44 and 46 that together define a notch 48 therebetween. The notch 48 leaves room for a cutting tool 66, as illustrated in FIG. 10. The notch 48 preferably includes an artifact receiving recess 50 that is shaped to receive an artifact 16 that may often protrude from the stock 12 caused by a preceding cutting action. The artifact receiving recess 50 enables the stop element 40 to correctly abut the stock end 13, without the measurement of the stock 12 being thrown off by the irregular shape of the artifact 16.

The stop element 40 may also include a locking feature that clamps against or otherwise engages the elongate body to lock the position of the stop element 40 a distance D from the tool end 26 of the elongate body. In one embodiment, the locking feature may be a set screw that extends through the stop element 40 to abut the rigid elongate body 20, although other locking elements and features (e.g., bolt/slot, ratchet teeth, etc.) may be used, and should be considered within the scope of the present invention.

In one embodiment, the adjustable stop tool 10 further includes a second stop 54, although this may not be included in some embodiments of the invention. The second stop 54 has a second locking feature 56 (e.g., set screw, etc.) for locking the position of the second stop 54 with respect to the rigid elongate body 20. The second stop 54 may include an upwardly extending wall 58 that extends between the two parts 59 of the second stop 54. A screw bore 60 extends through the upwardly extending wall 58, and a fine adjustment screw 62 threadedly engages through the screw bore 60. The fine adjustment screw 62 has a screw end 64 that is adapted to abut a cutting tool 66, for the purpose of adjusting the length of the cutting tool 66, as discussed in greater detail below. The second stop 54 may further include a set screw 68 that can be locked against the fine adjustment screw 62 for locking its position.

In one embodiment, the rigid elongate body 20 may be a darker, non-metal color (e.g., light blue), and the stop element 40 may be a lighter color, preferably also non-metal (e.g., light yellow). This use of darker and lighter non-metallic colors assists the user in the use of the adjustable stop tool 10, as discussed in greater detail below. Obviously, alternative colors may be selected consistent with the teachings of the present invention, and such alternatives should be considered within the scope of the present invention.

As illustrated in FIGS. 5-10, the adjustable stop tool 10 is utilized for positioning the stock 12 in the collet 18 for machining and cutting a segment 14 of the stock 12. For purposes of this application, the term "collet 18" is hereby defined to include any form of chuck used in a manner consistent with the present disclosure.

Figure 5:
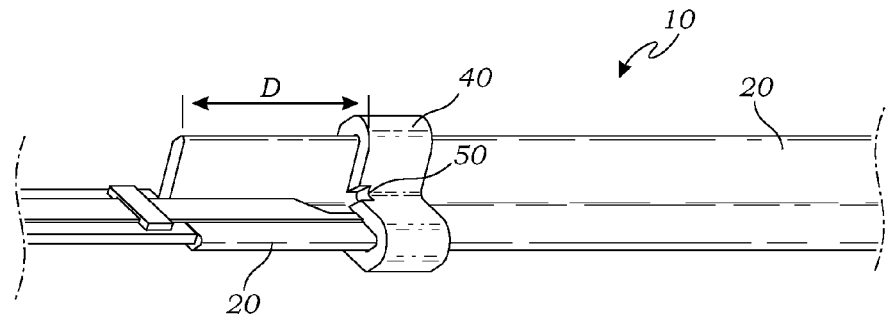
FIG. 5 is a perspective view of calipers being used to adjust the position of the stop element on the rigid elongate body.

First, the stop element 40 is positioned at a proper distance D from the tool end 26. FIG. 5 is a perspective view of calipers being used to adjust the position of the stop element on the rigid elongate body 20. In this manner, the position of the stop element 40 may be adjusted with great accuracy. In another embodiment, the measurement index 34 may be used to position the stop element 40 to the correct distance D. Other methods of positioning the stop element 40 may also be used, using techniques known in the art, and such alternatives should be considered within the scope of the present invention.

Figure 6:
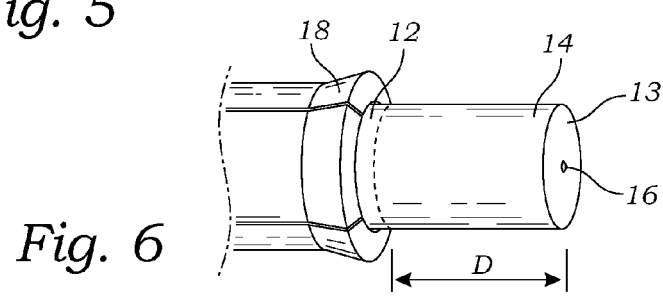
FIG. 6 is a perspective view of a stock once it has been pulled from a collet.

Once the adjustable stop tool 10 has been adjusted, the stock 12 is pulled from the collet 18. FIG. 6 is a perspective view of the stock 12 once it has been pulled from the collet 18. The stock 12 is pulled out further than the distance D defined by the adjustable stop tool 10. The tool may be pulled out using the adjustable stop tool 10, or by hand, or by any other method known in the art.

Figure 7:
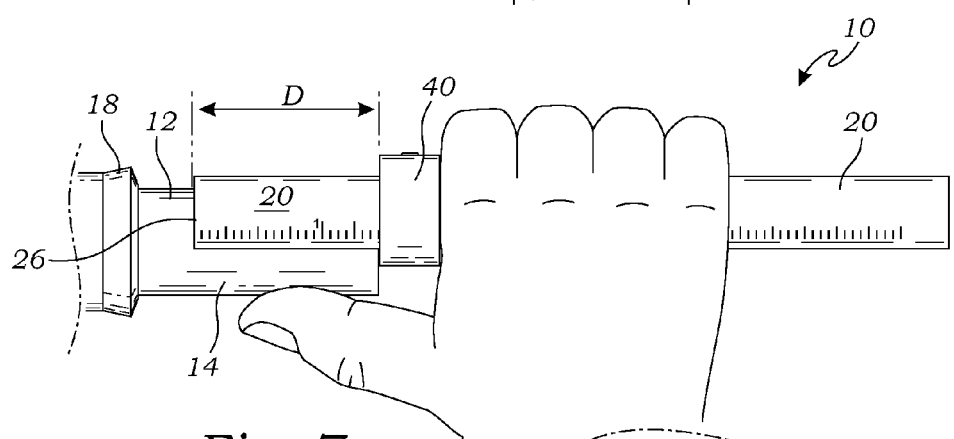
FIG. 7 is a front elevational view of the adjustable stop tool operably positioned against the stock.

As illustrated in FIG. 7, the adjustable stop tool 10 is then operably positioned against the stock 12 such that the stock 12 abuts the inner surface of the rigid elongate body 20 and the stock end 13 abuts the stop element 40. In the embodiment of FIGS. 1-4, in which the rigid elongate body 20 is generally L-shaped, the first and second sides 28A and 28B of the rigid elongate body 20 contact the stock 12 and serve to correctly orient and center the adjustable stop tool 10.

Figure 8:
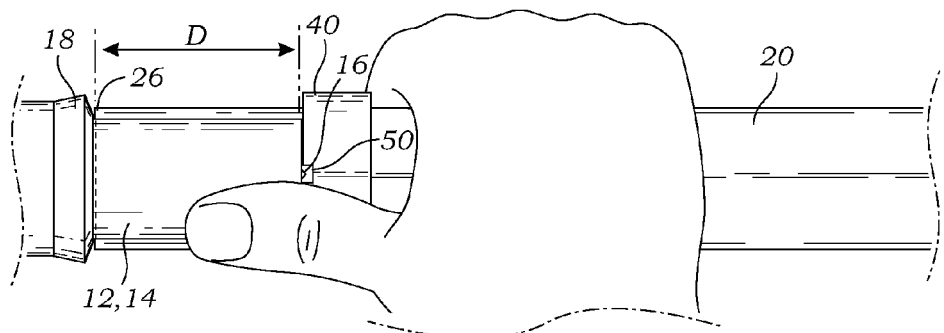
FIG. 8 is a front elevational view of the adjustable stop tool being used to push the stock towards the collet until the tool end of the adjustable stop tool abuts the collet.
Figure 9:
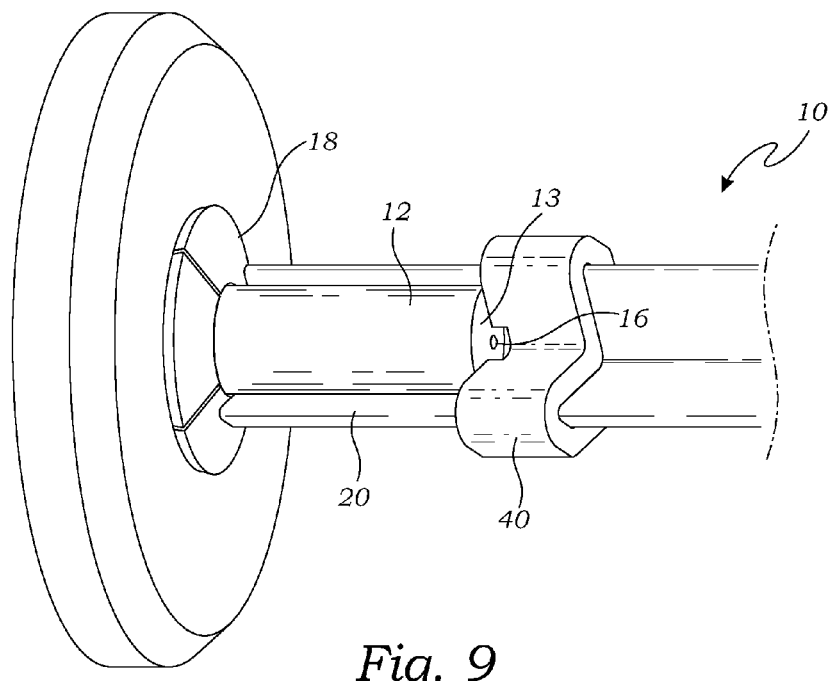
FIG. 9 is a perspective view thereof.

FIG. 8 is a front elevational view of the adjustable stop tool 10 being used to push the stock 12 towards the collet 18 until the tool end 26 of the adjustable stop tool 10 abuts the collet 18. FIG. 9 is a perspective view thereof. As illustrated in FIGS. 8 and 9, the adjustable stop tool 10 functions to physically locate the stock 12 in the correct position, so the segment 14 of the stock 12 is the correct length, the selected distance D. Not only does this make sure that the segment 14 of the stock 12 is the correct length, it also makes sure that each piece is identical to other pieces At this point, the collet 18 is closed to lock the stock 12 in the collet 18. The adjustable stop tool 10 may be clamped against the segment 14 of stock 12 (e.g., with the user's hand), so that the rigid elongate body 20 of the adjustable stop tool 10 physically maintains the correct length of the segment 14 of the stock 12, so that closing the collet 18 does not change the position of the stock 12 relative to the collet 18. Without such support, the closing of the collet 18 can often "pull" a slight amount of the stock 12 backwards, changing the size of the segment 14 of the stock 12. Once clamped in the collet 18, the segment 14 of stock 12 may be machined and cut using techniques known in the art.

In addition to correctly measuring out a length of the stock 12, the adjustable stop tool 10 may also be used to adjust the cutting tools utilized in machining the stock 12. FIG. 10 is a perspective view of a cutting tool 66 of a lathe turret 68 being adjusted using the second stop 54 of the adjustable stop tool 10. In this embodiment, the second stop 54 is locked in a second position that is approximately a second distance D2 from the tool end 26 using the second locking feature 56. The fine adjustment screw 62 may then be adjusted so that the screw end 64 is the second distance D2 from the tool end 26. The adjustable stop tool 10 may then be used in a similar manner to the method described above to adjust the position of the cutting tool in the turret.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A method for positioning stock in a collet, the method comprising the steps of:
    providing an adjustable stop tool comprising:
        a rigid elongate body having an inner surface and a tool end;
        a stop element slidably positioned on the rigid elongate body adjacent the inner surface; and
        a locking feature for locking the position of the stop element with respect to the rigid elongate body;
    positioning the stop element on the rigid elongate body such that the stop element is separated from the tool end by a distance;
    pulling a segment of the stock out of the collet until the stock end is separated from the collet by more than the distance;
    positioning the adjustable stop tool against the stock such that the stock abuts the inner surface of the rigid elongate body and the stock end abuts the stop element; and
    pushing the stock and the adjustable stop tool towards the collet until the tool end abuts the collet.

2. The method of claim 1, further comprising the steps of:
    closing the collet while simultaneously clamping the segment of stock against the rigid elongate body so that closing the collet does not change the position of the stock relative to the collet;
    machining the segment of stock; and
    cutting the segment of stock from the remainder of the stock once the segment of stock has been machined.

3. The method of claim 1, further comprising the steps of:
    providing a second stop having a second locking feature for locking the position of the stop element with respect to the rigid elongate body, and a screw bore having a fine adjustment screw threadedly engaged through the screw bore, the fine adjustment screw having a screw end;
    positioning the second stop so that it is approximately a second distance from the tool end; and
    adjusting the fine adjustment screw so that the screw end is the second distance from the tool end.

4. A method for positioning a segment of stock in a collet for machining and cutting of the segment of stock, the segment of stock having a stock end and a distance, the method comprising the steps of:
    providing an adjustable stop tool comprising:
        a rigid elongate body having an inner surface and a tool end;
        a stop element slidably positioned on the rigid elongate body adjacent the inner surface;
        a locking feature for locking the position of the stop element with respect to the rigid elongate body;
    positioning the stop element on the rigid elongate body such that the stop element is separated from the tool end by the distance;
    pulling the stock out of the collet until the stock end is separated from the collet by more than the distance;
    positioning the adjustable stop tool against the stock such that the stock abuts the inner surface of the rigid elongate body and the stock end abuts the stop element;
    pushing the stock and the adjustable stop tool towards the collet until the tool end abuts the collet;
    closing the collet while simultaneously clamping the segment of stock against the rigid elongate body so that closing the collet does not change the position of the stock relative to the collet;
    machining the segment of stock;
    cutting the segment of stock from the remainder of the stock once the segment of stock has been machined.

5. An adjustable stop tool for positioning a segment of stock for machining and cutting, the adjustable stop tool comprising:
    a rigid elongate body having an inner surface and a tool end, wherein the rigid elongate body is generally L-shaped, and includes first and second sides;
    a stop element slidably positioned on the rigid elongate body adjacent the inner surface, wherein the stop element is generally L-shaped and includes an L-shaped slot that is shaped to slidably receive the rigid elongate body therethrough, the stop element having first and second portions that define a notch therebetween, the notch having an artifact receiving recess; and
    a locking feature for locking the position of the stop element a distance with respect to the rigid elongate body.

6. The adjustable stop tool of claim 5, further comprising:
    a second stop having a second locking feature for locking the position of the stop element with respect to the rigid elongate body, and a screw bore having a fine adjustment screw threadedly engaged through the screw bore, the fine adjustment screw having a screw end.

7. The adjustable stop tool of claim 5, wherein the locking feature is a set screw that extends through the stop element to abut the rigid elongate body.

8. The adjustable stop tool of claim 5, further comprising a measurement index on the rigid elongate body.

9. The adjustable stop tool of claim 5, further comprising a frictional structure on the inner surface in a top lip area adjacent the tool end, to increase friction between the adjustable stop tool and the stock.

* * * * *